(12) United States Patent
Walker et al.

(10) Patent No.: US 8,286,144 B2
(45) Date of Patent: Oct. 9, 2012

(54) ADMINISTERING A PROCESS FILESYSTEM WITH RESPECT TO PROGRAM CODE CONVERSION

(75) Inventors: James W. Walker, Manchester (GB); Ryan J. Cocks, West Yorkshire (GB)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 11/906,106

(22) Filed: Sep. 28, 2007

(65) Prior Publication Data

US 2008/0082971 A1 Apr. 3, 2008

Related U.S. Application Data

(60) Provisional application No. 60/854,543, filed on Oct. 26, 2006.

(30) Foreign Application Priority Data

Oct. 2, 2006 (GB) .................................. 0619402.1

(51) Int. Cl.
*G06F 9/45* (2006.01)
(52) U.S. Cl. ........................................................ 717/136
(58) Field of Classification Search ........................ None
See application file for complete search history.

(56) References Cited

U.S. PATENT DOCUMENTS

| | | | |
|---|---|---|---|
| 2004/0133766 A1* | 7/2004 | Abraham et al. | 712/217 |
| 2004/0210880 A1* | 10/2004 | Souloglou et al. | 717/138 |
| 2004/0221280 A1* | 11/2004 | Bolton et al. | 717/151 |
| 2004/0243983 A1* | 12/2004 | Kumura | 717/136 |
| 2008/0209175 A1* | 8/2008 | Brown | 712/208 |

FOREIGN PATENT DOCUMENTS

| | | |
|---|---|---|
| GB | 2 424 092 A | 9/2006 |
| JP | 06-095891 | 4/1994 |
| JP | 11-345134 | 12/1999 |
| JP | 2005099968 | 4/2005 |
| WO | WO-00/22521 A3 | 4/2000 |
| WO | 2005008479 | 1/2005 |
| WO | WO-2005/001639 A2 | 1/2005 |

OTHER PUBLICATIONS

"Linux Apps on Solaris", retrieved from http://linux.slashdot.org/story/04/08/04/1248251/linux-apps-on-solaris on Nov. 1, 2011.*
Search Report issued for GB 0619402.1 dated Jan. 29, 2007.
Bellard, "QEMU, a Fast and Portable Dynamic Translator", Proceedings of the Freenix/Open Source Track, 2005 USENIX Annual Technical Conference, pp. 41-46, Retrieved from Internet: www.usenix.org/publications/library/proceedings/usenix05/tech/freenix/full_papers/bellard/bellard.pdf.

(Continued)

*Primary Examiner* — Philip Wang
(74) *Attorney, Agent, or Firm* — Yudell Isidore Ng Russell PLLC

(57) ABSTRACT

A technique is provided for administering references to a subject process filesystem during translation of subject code into target code in a dynamic binary translator. The subject code for execution on a subject processor is received by a translator, and corresponding target code for execution on the target processor is generated. The translator is arranged to establish, populate and maintain a process data structure, so that code can be generated by the translator in which subject references to the subject process filesystem are handled effectively.

32 Claims, 4 Drawing Sheets

OTHER PUBLICATIONS

"BrandZ Design Doc at OpenSolaris.org", http://web.archive.org/web/20060520040145/.

Kishore, et al., "BrandZ: a Framework for Non-Native Virtualized Operating Environments in OpenSolaris", Conference Foss.IN/2006, Bandalore, India, Nov. 25, 2006, http://foss.in/2006/cfp/slides/BrandZ_A_Framework_for_non-native_Vitualized_operating_environment_in_OpenSolaris_75.pdf.

"OpenSolaris Forums: Brandz & QEMU", http://opensolaris.org/jive/thread.jsp, Aug. 2, 2006.

International Search Report issued for PCT/GB2007/050598, dated Jan. 17, 2008.

Ryoji Kamei, "Feature Article 1; Mechanisms for a UNIX Emulator, The Complete Guide to Cygwin" C Magazine, Softbank Publishing Corp., vol. 17(7), pp. 40-41, Jul. 1, 2005.

* cited by examiner

ADMINISTERING A PROCESS FILESYSTEM WITH RESPECT TO PROGRAM CODE CONVERSION

CROSS REFERENCE TO RELATED APPLICATIONS

This application claims benefit of GB Patent Application No. 0619402.1 filed Oct. 2, 2006 and U.S. Provisional Patent Application Ser. No. 60/854,543, filed Oct. 26, 2006.

FIELD OF THE INVENTION

The present invention relates generally to the field of computers and computer software, and more particularly to program code conversion methods and apparatus useful, for example, in code translators, emulators and accelerators which convert program code that refers to a process filesystem.

BACKGROUND TO THE INVENTION

Across the embedded and non-embedded CPU market, one finds predominant Instruction Set Architectures (ISAs) for which large bodies of software exist that could be "accelerated" for performance, or "translated" to a myriad of capable processors that could present better cost/performance benefits, provided they could transparently access the relevant software. One also finds dominant CPU architectures that are locked in time to their ISA, and cannot evolve in performance or market reach and would benefit from "synthetic CPU" co-architecture.

It is often desired to run program code written for a computer processor of a first type (a "subject" processor) on a processor of a second type (a "target" processor). Here, an emulator or translator is used to perform program code conversion, such that the subject program is able to run on the target processor. PCT application WO00/22521 discloses program code conversion methods and apparatus to facilitate such acceleration, translation and co-architecture capabilities as may be employed in embodiments of the present invention.

In certain operating systems, including in particular Unix-like operating systems, a process filesystem is provided. The process file system can be used by a process to access information about other processes, and about the hardware environment provided by the processor. For example, the Solaris operating system from Sun Microsystems Inc. provides a process filesystem comprising a virtual filesystem in a directory known as /proc. The contents of and structure of /proc are built dynamically by the operating system as processes are run, with typically one sub-directory created and maintained per live process.

The provision of a process filesystem as described above can complicate program code conversion. There are three ways in which this is evident. Firstly, if the target operating system does not provide a process filesystem, but the subject code refers to one then there is inherent incompatibility.

Secondly, if the target operating system does provide a process filesystem, its arrangement and operation may still be incompatible with the process filesystem referred to by the subject code.

Thirdly, if the target operating system does provide a compatible process filesystem it may be difficult to distinguish translator processes from other processes in the target process filesystem.

One option to allow integration of information relating to subject processes into a target operating system's process filesystem is to modify the target processor's operating system. Modification of the target operating system can change the way the target process filesystem is constructed and administered, and may be achieved by building a kernel module and inserting this into the target operating system, or by direct source code modification of the target operating system. However, modification of the target operating system may be a difficult task, and may destabilise the target operating system.

A method of administering a process filesystem with respect to translation of subject program code is provided, such as for example when the translator is part of computer system as described herein. A translator operatable to convert subject code to target code can be arranged such that references in the subject program to the subject process filesystem are identified, and target code generated. The generated target code enables the translator to reference and provide process information in a way which is consistent with the expected behaviour of the subject processor, improving the operation of a computer system on which the translator is operating.

Preferred embodiments of the present invention enable subject process information to be administered conveniently by the translator, without modification of the target operating system. This avoids destabilising the target operating system, and allows the translator to deal correctly with the behaviour of potentially unstable subject processes during translation.

The present invention may thereby improve performance of a computer system, for example while that system is undertaking program code conversion.

SUMMARY OF THE INVENTION

According to the present invention there is provided an apparatus and method as set forth in the appended claims. Preferred features of the invention will be apparent from the dependent claims, and the description which follows.

In one exemplary aspect there is provided a computer apparatus comprising: a target processor; and a translator process established in response to received subject code instructions for execution on a subject processor; wherein the translator process is arranged: (a) to populate a process data structure with information concerning the established translator process; and (b) to refer to the process data structure of step (a) in response to a reference made in received subject code to information in a subject process filesystem.

The translator process may be arranged to establish a further translator process in response to each received subject code instruction which, when executed on a subject processor, would establish a subject process. Each translator process of a plurality of translator processes may populate and refer to a common process data structure. The process data structure suitably comprises one or both of: (a) a directory accessible to each translator process; and (b) a shared memory region accessible to each translator process. The computer apparatus may further comprise an auditor arranged to check the status of translator processes whose information is present in the process data structure, and to remove from the process data structure information relating to translator processes which are no-longer running.

In another exemplary aspect there is provided a method of administering a process filesystem with respect to program code conversion from subject code for execution on a subject processor to target code for execution on a target processor, the method comprising steps of: (a) establishing a translator process in response to received subject code instruction which, when executed on a subject processor, would establish a subject process; (b) populating a process data structure accessible to the translator process with information concerning one or more translator processes established in response to the received subject code; and (c) in response to a reference to information in a subject process filesystem in received subject code referring to the data structure populated in step (b).

The method may further comprise the steps of checking the status of processes whose information is stored in the process data structure, and removing from the process data structure information relating to translator processes which are no-longer running, for example by checking the status of processes whose information is stored in the data structure is performed periodically. The method may further comprise the step of: (d) recording that a reference has been made to information in the process data structure by recording an identifier for the translator process making the reference, and an identifier for the translator process whose information is being referenced. The method may further comprise the step of removing from the process data structure the data recorded at step (d) when the translator process whose information is being referenced is no-longer running.

In a still further aspect there is provided a computer-readable medium having recorded thereon instructions implementable by a computer to perform the method of administering a process filesystem with respect to program code conversion from subject code for execution on a subject processor to target code for execution on a target processor, the method comprising steps of: (a) establishing a translator process in response to received subject code instruction which, when executed on a subject processor, would establish a subject process; (b) populating a process data structure accessible to the translator process with information concerning one or more translator processes established in response to the received subject code; and (c) in response to a reference to information in a subject process filesystem in received subject code referring to the data structure populated in step (b).

In a still further aspect there is provided a translator apparatus arranged to receive subject code for execution on a subject processor and generate target code for execution on the target processor; wherein the translator is arranged: (a) to populate a process data structure with information concerning one or more translator processes established in response to received subject code; and (b) to refer to the process data structure of step (a) in response to a reference in received subject code to information in a subject process filesystem.

The above summary of various aspects and advantages realisable according to various embodiments of the improved architecture for program code conversion according to the present invention is provided as an introduction to assist those skilled in the art to more rapidly assimilate the detailed discussion of the invention that ensues and does not and is not intended in any way to limit the scope of the claims appended hereto.

BRIEF DESCRIPTION OF THE DRAWINGS

The accompanying drawings, which are incorporated in and constitute a part of the specification, illustrate presently preferred implementations and are described as follows.

DETAILED DESCRIPTION OF EXEMPLARY EMBODIMENTS

The following description is provided to enable a person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved program code conversion method and apparatus.

Figure 1:
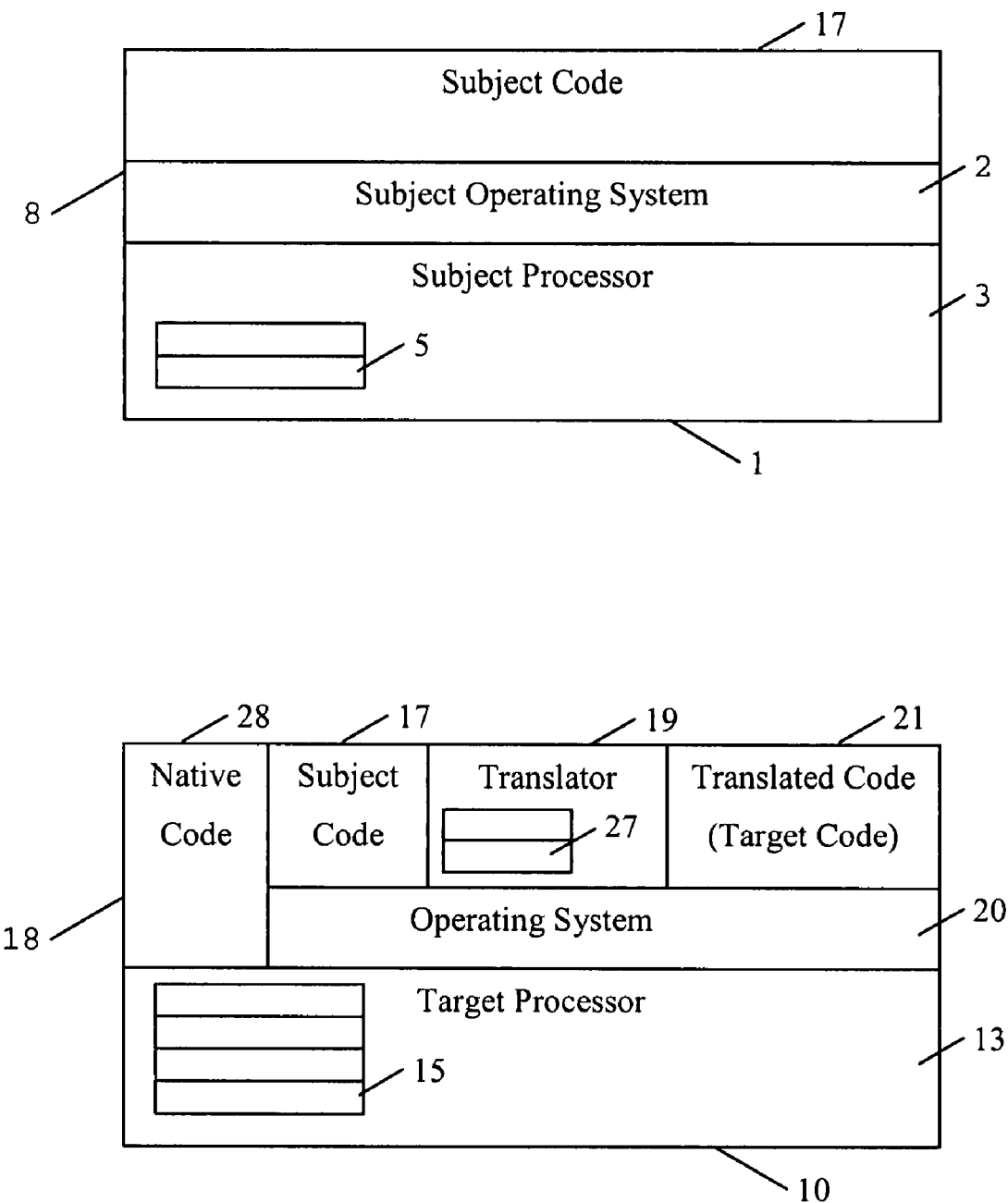
FIG. 1 is a block diagram illustrative of apparatus wherein embodiments of the invention find application.

Referring to FIG. 1, a subject program 17 is intended to execute on a subject computing platform 1 having a subject processor 3. However, a target computing platform 10 is instead used to execute the subject program 17, through a translator unit 19 which performs program code conversion. The translator unit 19 performs code conversion from the subject code 17 to target code 21, such that the target code 21 is executable on the target computing platform 10.

As will be familiar to those skilled in the art, the subject processor 3 has a set of subject registers 5. A subject memory 8 holds, inter alia, the subject code 17 and a subject operating system 2. Similarly, the example target computing platform 10 in FIG. 1 comprises a target processor 13 having a plurality of target registers 15, and a memory 18 to store a plurality of operational components including a target operating system 20, the subject code 17, the translator code 19, and the translated target code 21. The target computing platform 10 is typically a microprocessor-based computer or other suitable computer.

In one embodiment, the translator code 19 is an emulator to translate subject code of a subject instruction set architecture (ISA) into translated target code of another ISA, with or without optimisations. In another embodiment, the translator 19 functions as an accelerator for translating subject code into target code, each of the same ISA, by performing program code optimisations.

The translator code 19 is suitably a compiled version of source code implementing the translator, and runs in conjunction with the operating system 20 on the target processor 13. It will be appreciated that the structure illustrated in FIG. 1 is exemplary only and that, for example, software, methods and processes according to embodiments of the invention may be implemented in code residing within or beneath an operating system 20. The subject code 17, translator code 19, operating system 20, and storage mechanisms of the memory 18 may be any of a wide variety of types, as known to those skilled in the art.

In the apparatus according to FIG. 1, program code conversion is performed dynamically, at run-time, to execute on the target architecture 10 while the target code 21 is running. That is, the translator 19 runs inline with the translated target code 21. Running the subject program 17 through the translator 19 involves two different types of code that execute in an interleaved manner: the translator code 19; and the target code 21. Hence, the target code 21 is generated by the translator code 19, throughout run-time, based on the stored subject code 17 of the program being translated.

In one embodiment, the translator unit 19 emulates relevant portions of the subject architecture 1 such as the subject processor 3 and particularly the subject registers 5, whilst actually executing the subject program 17 as target code 21 on the target processor 13. In the preferred embodiment, at least one global register store 27 is provided (also referred to as the subject register bank 27 or abstract register bank 27). In a multiprocessor environment, optionally more than one abstract register bank 27 is provided according to the architecture of the subject processor. A representation of a subject state is provided by components of the translator 19 and the target code 21. That is, the translator 19 stores the subject state in a variety of explicit programming language devices such as variables and/or objects. The translated target code 21, by comparison, provides subject processor state implicitly in the target registers 15 and in memory locations 18, which are manipulated by the target instructions of the target code 21. For example, a low-level representation of the global register store 27 is simply a region of allocated memory. In the source code of the translator 19, however, the global register store 27 is a data array or an object which can be accessed and manipulated at a higher level.

The term "basic block" will be familiar to those skilled in the art. A basic block is a section of code with exactly one entry point and exactly one exit point, which limits the block code to a single control path. For this reason, basic blocks are a useful fundamental unit of control flow. Suitably, the translator 19 divides the subject code 17 into a plurality of basic blocks, where each basic block is a sequential set of instructions between a first instruction at a single entry point and a last instruction at a single exit point (such as a jump, call or branch instruction). The translator 19 may select just one of these basic blocks (block mode) or select a group of the basic blocks (group block mode). A group block suitably comprises two or more basic blocks which are to be treated together as a single unit. Further, the translator may form iso-blocks representing the same basic block of subject code but under different entry conditions.

In the preferred embodiments, trees of Intermediate Representation (IR) are generated based on a subject instruction sequence, as part of the process of generating the target code 21 from the original subject program 17. IR trees are abstract representations of the expressions calculated and operations performed by the subject program. Later, the target code 21 is generated based on the IR trees. Collections of IR nodes are actually directed acyclic graphs (DAGs), but are referred to colloquially as "trees".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of abstract register definitions which correspond to specific features of the subject architecture upon which the subject program 17 is intended to run. For example, there is a unique abstract register definition for each physical register on the subject architecture (i.e., the subject registers 5 of FIG. 1). As such, abstract register definitions in the translator may be implemented as a C++ object which contains a reference to an IR node object (i.e., an IR tree). The aggregate of all IR trees referred to by the set of abstract register definitions is referred to as the working IR forest ("forest" because it contains multiple abstract register roots, each of which refers to an IR tree). These IR trees and other processes suitably form part of the translator 19.

Figure 2:
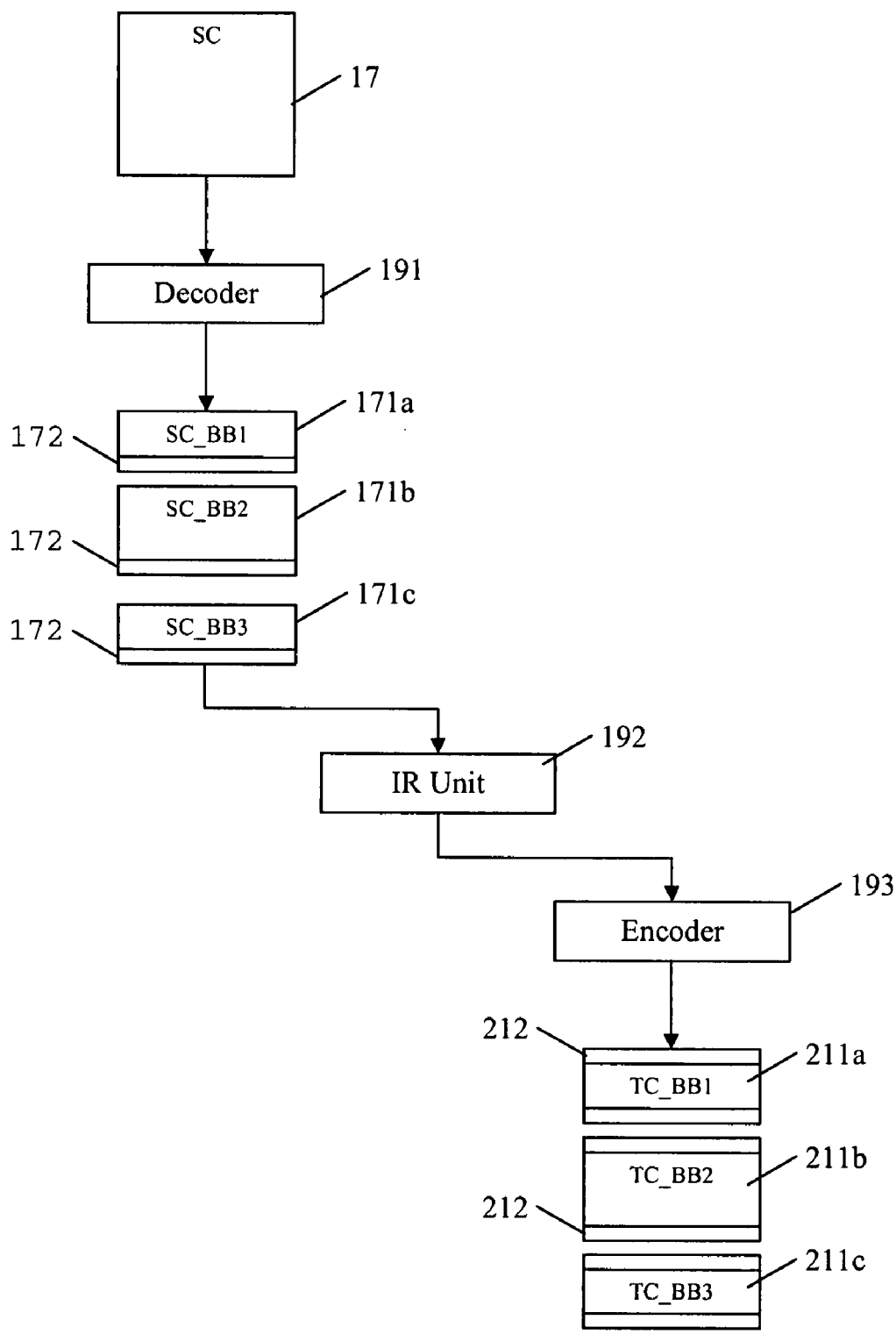
FIG. 2 is a schematic diagram of a translator unit as employed by embodiments of the present invention.

FIG. 2 illustrates the translator 19 in more detail when running on the target computing platform 10. As discussed above, the front end of the translator 19 includes a decoder unit 191 which decodes a currently needed section of the subject program 17 to provide a plurality of subject code blocks 171a, 171b, 171c (which usually each contain one basic block of subject code), and may also provide decoder information 172 in relation to each subject block and the subject instructions contained therein which will assist the later operations of the translator 19. In some embodiments, an IR unit 192 in the core of the translator 19 produces an intermediate representation (IR) from the decoded subject instructions, and optimisations are opportunely performed in relation to the intermediate representation. An encoder 193 as part of the back end of the translator 19 generates (plants) target code 21 executable by the target processor 13. In this simplistic example, three target code blocks 211a-211c are generated to perform work on the target platform 10 equivalent to executing the subject code blocks 171a-171c on the subject platform 1. Also, the encoder 193 may generate header code and/or footer code 212 for some or all of the target code blocks 211a-211c which performs functions such as setting the environment in which the target block will operate and passing control back to the translator 19 where appropriate.

Figure 3:
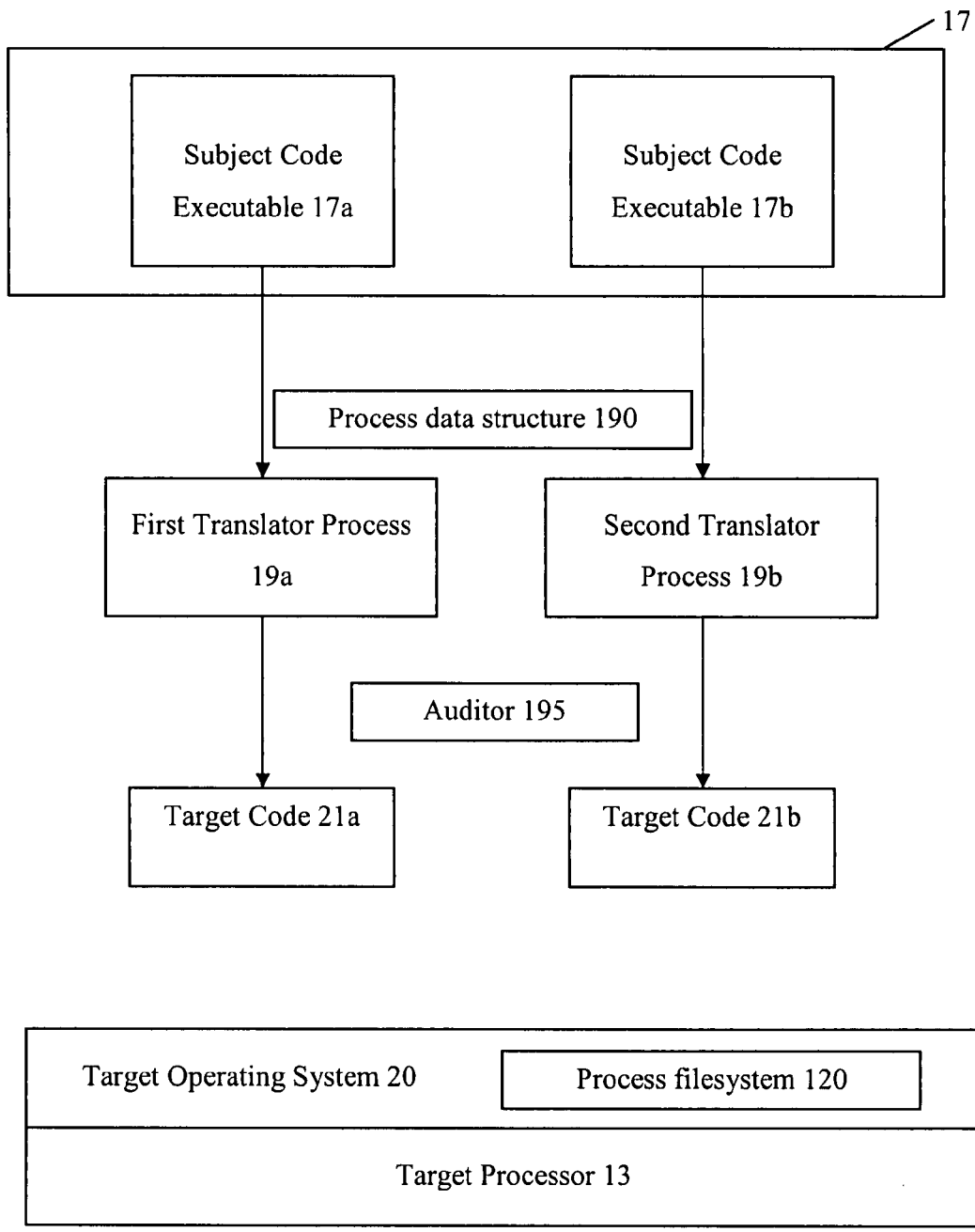
FIG. 3 is a block diagram illustrative of an apparatus as employed by embodiments of the invention.

FIG. 3 is a more detailed schematic diagram illustrating an apparatus as employed by embodiments of the present invention. In the illustrative example of FIG. 3, a translator 19 is arranged to perform a Solaris to Linux translation. However, as described in more detail below, the present invention may also be useful when translation is performed for optimisation and acceleration purposes, such as in conversion from Linux to Linux, or Solaris to Solaris.

In the Solaris to Linux embodiment shown in FIG. 3 the target processor 13 comprises a process filesystem 120 as part of the target operating system 20, but as explained in detail below the process filesystem 120 of the target processor 13 is not necessarily or indeed ordinarily used when the subject code 17 makes reference to a process filesystem.

The subject code 17 comprises a first subject executable 17a which is to be translated into first target code 21a. The subject executable 17a contains instructions which establish at least one process, if executed on a subject processor. As a process-establishing instruction in the subject executable file 17a is encountered by a first translator process 19, a corresponding entry is made in a process data structure 190 accessible to the translator process 19a.

The subject code 17 may contain instructions which would, when executed on a subject processor, establish more than one process. FIG. 3 also shows a second translator process 19b. The second translator process 19b operates to translate a second subject executable file 17b into target code 21b.

The process data structure 190 can be initialised before a translator process works through a first block of subject code, or alternatively can be initialised when a first subject code instruction is encountered in a first block of subject code.

In example embodiments, the process data structure 190 comprises a directory accessible to translator processes running on the target processor 13. In other example embodiments the process data structure 190 may comprise a shared memory region accessible to translator processes running on the target processor 13. The process data structure 190 contains process identifiers.

The translator processes are arranged to identify certain instructions in the subject code 17 relating to the subject process filesystem and to emulate the required functionality that would be provided by the subject process filesystem. The translator processes accomplish this using the process data structure 190.

For example, the subject executable file 17*a* may request details of the processes which have an entry in the subject process filesystem. When the subject code is run on a subject processor this request is typically performed as a precursor to referencing information in the subject process filesystem.

In the example embodiment in which the subject processor runs under Solaris, the subject executable file 17*a* may call the function:

getdents(/proc/)

In response to this instruction, the translator process 19*a* is arranged to provide corresponding information from the process data structure 190. The process data structure 190 has been initialised and populated with information relating to each established subject process. For example, a translator process may establish a directory /tmp/pds to contain the process information, and this directory can be populated by each translator process with process information in the form of process identifiers for each subject process that is being translated.

For convenience, the process data structure 190 can be arranged so that the process identifiers stored in the process data structure correspond directly to the subject code process identifiers. In other example embodiments the process data structure may contain a file for each process, the files comprising the process identifier along with other information relating to the process.

The translator process 19*a* in this example can then execute the target function:

getdents(/tmp/pds), which will return the relevant process identifiers from the process data structure.

In the present example, where the translator processes convert Solaris code to run on a Linux processor, the translator processes establish a communication socket in the directory /tmp/pds for each process. For convenience, the translator processes are arranged to assign each socket a name which corresponds to the relevant process identifier.

Once the relevant process identifiers have been obtained, it is likely that the subject code 17*a* will refer to one of the processes. For example, the translator process 19*a* may encounter a subject instruction such as open(/proc/{process_identifier}/ctl)

where {process_identifier} is an identifier of a process which the subject executable 17*a* expects to be running. In the example embodiment, {process_identifier} may be the identifier of the process which is being translated by the second translator process 19*b*. The subject code 17 may expect a process to be running, for example if a previous subject code getdents(/proc/) instruction has been encountered and handled as explained above.

The translator process 19*a* recognises that the open instruction relates to the /proc process filesystem, and handles this instruction by referring to the process data structure 190. However, before trying to access the process data structure 190, the translator process 19*a* is arranged, in example embodiments, to verify that the process to be referred to is still running.

The translator process 19*a* has no control of the period of time between encountering a subject getdents(/proc/) instruction, and a subject instruction which refers to information provided in response to a previous getdents(/proc/) instruction. Furthermore, the translator process 19*a* can not rely on subject processes identified in the process data structure 190 to still be running when a subject instruction which refers to them is encountered.

For example, a process identified in the process data structure 190 may crash unexpectedly soon after its process identifier is provided. Therefore, in the time period between the translator process 19*a* obtaining a list of process identifiers based on the process data structure 190 and the subsequent use of the process identifiers, the list of process identifiers may have become out of date.

At each reference in the subject code 17 to another process, the translator processes may be further arranged to verify that the process referenced is still running. In the example embodiment, the translator process 19*a* can perform this verification by checking the sockets of the processes in the process data structure 190.

Continuing the example above, the translator process 19*a* is arranged to verify that the process referenced by the open instruction is still running, before continuing to the next subject instruction. Once the process referenced is opened, the subject code may go on to perform additional work, such as e.g. stopping the process. A typical subject code instruction for this operation is:

write(fd,PCSTOP); where fd is a file descriptor identifying the process in question.

Again, for the translator process 19*a* to properly emulate this subject instruction the process in question must actually be running. Therefore, the translator process 19*a* is arranged to re-check the status of the process in question. If the process in question is still running as expected, the translator process 19*a* can request the translator process which translating the process in question to perform the stop.

In the present example, the translator process 19*a* requests the translator process 19*b* to perform the stop.

Although the example embodiment shown in FIG. 3 comprises the first translator process 19*a* referencing the process data structure 190 to control a process being run under the second translator process 19*b*, there may be circumstances in which a translator process will reference data in the process data structure relating to itself. For example, the process data structure may comprise information on a process's memory mappings, and a translator may encounter a subject instruction such as:

open(/proc/{process_identifier}/map), where the {process_identifier} in question is self-referencing.

If at any point a translator instance establishes that a process being referenced has un-expectedly stopped running, the translator process can return an error notification. The error notification provided by the translator can be consistent with the expected behaviour of the subject program when running natively on a subject processor.

To maintain the information in the process data structure 190, a translator process can be arranged to audit the identifiers present in the process data structure 190. This auditing can be performed by one translator process on behalf of all the translator processes, or can be performed by each translator process to distribute the auditing workload. Alternatively, the auditing can be performed by a module outside the translator, which operates to maintain the process data structure for all translator processes running on the target processor. Such a module may comprise an auditor 195 as shown in FIG. 3.

The auditor 195 recognises that a process running under a first translator process is referencing a process running under a second translator process. For example, when the first translator process encounters a subject instruction such as write (fd,PCSTOP), the auditor 195 records that the process running under the first translator process is referencing the process running under the second translator process. This can be achieved conveniently if the write instruction is communicated to the second translator process via the auditor 195. Conveniently, the auditor may record these references in the process data structure 190.

Figure 4:
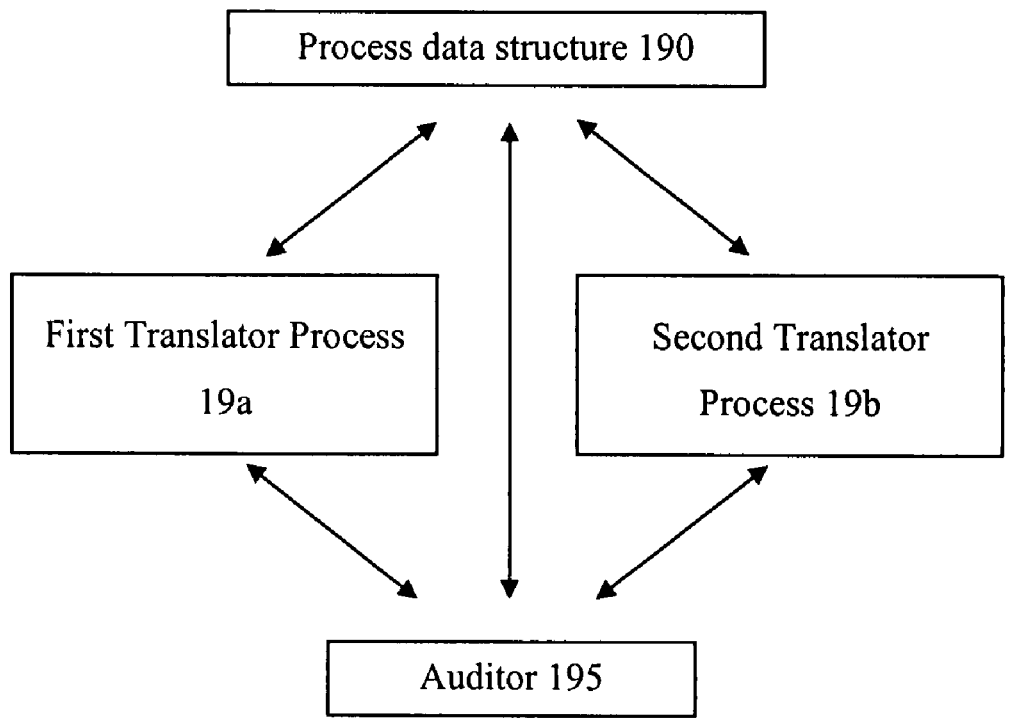
FIG. 4 is a schematic diagram illustrating communication channels employed in an example embodiment of the invention.

Messages between translator processes, auditor and process data structure can be communicated conveniently using sockets, as described above, and over the pathways shown in FIG. 4.

If the referenced process is still running, the second translator process receives the message from the first translator process, and notifies the first translator process with confirmation that the referenced process has been stopped correctly. This notification can also conveniently be sent via the auditor 195. The auditor 195 can then delete its record that the process running under the first translator process has referenced the process running under the second translator process. The deletion of this record helps the translator processes and auditor to deal correctly with exiting processes and unstable processes, as explained in more detail below.

If the referenced process is exiting when the reference is received, the second translator process discards the incoming message, and the stop is not performed in accordance with the first translator process's request. However, the second translator process is arranged to notify the auditor 195 of the fact that it is in the process of exiting, i.e. that it will soon no-longer be running. This enables the auditor to then: remove the details of the stopped process from the process data structure; to notify the first translator process that the referenced process has exited; and to delete its record that the process running under the first translator process has referenced the process running under the second translator process. The notification passed from the auditor 195 to the first translator process allows the first translator process to return a correct error message, confirming to the subject code that the write instruction was not performed.

If at any point the referenced process has crashed, the message sent from the first translator process is not received. The first translator process can not tell that the referenced process has crashed, and is left waiting on a response from the second translator process. In these circumstances the auditor 195 can resolve the problem for the first translator process. The auditor 195 is arranged to check for records of messages being passed from process to process, and to check that processes recorded in the process data structure are running. If the auditor 195 detects that a process is no-longer running, it removes the information relating to that process from the process data structure, and removes the record that the first process has referenced the second process. The auditor 195 can then return a notification to the first translator process to confirm that the referenced process is no-longer running. The notification passed from the auditor 195 to the first translator process allows the first translator process to return a correct error message, confirming to the subject code that the write instruction was not performed because the referenced process is no-longer running.

The auditor 195 can be arranged periodically to check the process data structure for records of messages relating to processes which are no-longer running, and to remove such records as stale. The auditor 195 can alternatively or in addition perform such checks after a certain number of messages have been passed between processes.

Figure 5:
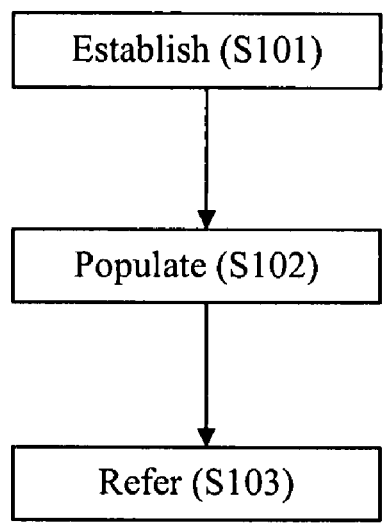
FIG. 5 is a schematic diagram illustrating a method of administering a process filesystem, according to an example embodiment of the present invention.

To further aid understanding of embodiments of the present invention, the example method diagram of FIG. 5 is provided. At step S101 a translator process is established in response to received subject code instruction which, when executed on a subject processor, would establish a subject process. At step S102 the established translator process populates a process data structure accessible with information concerning the translator process established at step S101. At step S103 the data structure populated at step S102 is referred to, in response to a reference to information in a subject process filesystem in received subject code.

The exemplary embodiments described herein have particular utility in conversion of program code in a translator, where the subject and target processors are different. However, even if the subject and target processors operate under operating systems with compatible process filesystems, e.g. when the subject and target operating systems are of the same type, it may be desirable for translator processes to access other translator processes.

The exemplary embodiments described herein establish and maintain a process data structure for translator processes which can be used to enable references in the subject code to the subject process filesystem to be handled correctly. By periodically checking the status of the processes in the process data structure and removing or otherwise marking those which are no-longer running a translator can correctly deal with references in the subject code to processes which have exited or crashed.

As described above, this is particularly useful if the subject code to be translated contains potentially unstable processes. Modifying the target operating system to distinguish subject and target processes in the target process filesystem may not easily allow unstable processes to be identified and handled correctly, from the point of view of a translator. However, the example embodiments as described herein can conveniently address this issue.

The example embodiments employ a translator to identify and handle references to the subject process filesystem during program code conversion. The translator provides a convenient mechanism for recognising and handling instructions and function calls in the subject code that relate to the subject process filesystem. However, it is to be understood that in other embodiments the mechanism for recognising and handling such instructions and function calls may be implemented in other ways. For example, the target processor may be set up with a modified system directory, or to default on all system calls. Any suitable mechanism may be employed for breaking control flow of the subject program code when relevant instructions are recognised. Control flow can then be transferred to code suitable for implementing the present invention.

In addition to the example embodiments described herein, the invention may also be implemented in a separate module, such as e.g. a hardware module for use with a translator or the like. The module may provide the functionality ascribed herein to the translator process, yet existing as a logically separate entity from the unit for performing the program code conversion. As mentioned above, embodiments of the translator may be useful for performing program code conversion in environments where the target and subject operating systems are different. Embodiments of the translator may also be useful for performing program code conversion for acceleration or emulation purposes, for example in enabling program code conversion from code of a particular operating system to run under the same operating system but with additional level of control enabled by use of the process data structure.

The terms "translator" and "translator process" used herein are to be read to encompass related apparatus such emulators, accelerators or interpreters operable as or during the process of code conversion. In particular the translator process referred to herein may be used The different features of the apparatus and method of the present invention are described separately in each of the above embodiments. However, it is the full intention of the inventors of the present invention that the separate aspects of each embodiment described herein may be combined with the other embodiments described herein.

The methods described herein are directed at program code conversion, and are particularly useful in connection with a run-time translator that provides dynamic binary translation of subject program code into target code. The present invention also extends to a translator apparatus operating as part of a computer system arranged to perform any of the methods defined herein. Also, the present invention extends to computer-readable storage medium having recorded thereon instructions implementable by a computer to perform any of the methods defined herein.

At least some embodiments of the invention may be constructed solely using dedicated hardware, and terms such as 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the preferred embodiments have been described with reference to the components, modules and units discussed below, such functional elements may be combined into fewer elements or separated into additional elements.

Those skilled in the art will appreciate that various adaptations and modifications of the just described example embodiments can be configured without departing from the scope and spirit of the invention. Therefore, it is to be understood that, within the scope of the appended claims, the invention may be practiced other than as specifically described herein.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment (s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computer apparatus comprising:
   a target processor; and
   data storage coupled to the target processor, the data storage including:
   an operating system having a target process filesystem; and
   a translator process running above the operating system that dynamically translates received subject code intended for execution on a subject processor into target code for execution on the operating system by the target processor, wherein the translator process, when executed, is arranged:
   (a) to populate a target process data structure with information concerning the translator process; and
   (b) responsive to a reference made in the received subject code to information in a subject process filesystem, to refer to the target process data structure instead of the target process filesystem.

2. The computer apparatus of claim 1, wherein the translator process is arranged to establish a further translator process in response to each received subject code instruction which, when executed on a subject processor, would establish a subject process.

3. The computer apparatus of claim 2, wherein the translator process and each further translator process are different instances of a common process.

4. The computer apparatus of claim 3, wherein the translator process and each further translator process populate and refer to the same target process data structure.

5. The computer apparatus of claim 4, wherein the target process data structure comprises one or both of: (a) a directory accessible to each translator process; and (b) a shared memory region accessible to each translator process.

6. The computer apparatus of claim 1, wherein the translator process is arranged to populate the target process data structure with a process identifier for each translator process, the process identifier corresponding to that which would be allocated to the subject processes established in response to the received subject code instructions, when executed on a subject processor.

7. The computer apparatus of claim 1, further comprising an auditor arranged to check the status of translator processes whose information is present in the target process data structure, and to remove from the target process data structure information relating to translator processes which are no-longer running.

8. The computer apparatus of claim 7, wherein the auditor is arranged to check periodically the status of translator processes whose information is present in the target process data structure.

9. The computer apparatus of claim 7, wherein the auditor comprises part of the translator process.

10. The computer apparatus of claim 1, further comprising an auditor, wherein the auditor is arranged to record that a reference has been made to information in the target process data structure.

11. The computer apparatus of claim 10, wherein the auditor is arranged to record a first identifier for the translator process making the reference in association with a second identifier for a translator process whose information is being referenced.

12. The computer apparatus of claim 11, wherein the auditor is arranged to record the first and second identifiers in the target process data structure.

13. The computer apparatus of claim 12, wherein the auditor is arranged to remove from the target process data structure the data it has recorded when the process whose information is being referenced is determined to be no-longer running.

14. The computer apparatus of claim 1, wherein the translator process removes information relating to itself from the target process data structure when the translator process exits.

15. The computer apparatus of claim 1, wherein the target processor employs a same instruction set architecture as the subject processor on which the subject code is intended for execution.

16. The computer apparatus of claim 1, wherein the translator process comprises a Solaris-to-Linux translator.

17. The computer apparatus of claim 1, wherein the translator process, responsive a call in the subject code, verifies by reference to the target process data structure that a target process referenced by the call is currently running.

18. The computer apparatus of claim 1, wherein the target process data structure includes information regarding a memory mapping of the translator process.

19. A method in a data processing system of administering a process filesystem with respect to program code conversion from subject code for execution on a subject processor to target code for execution by a target processor of the data processing system, the method comprising:
the data processing system executing an operating system having a target process filesystem;
the data processing system establishing a translator process running above the operating system in response to received subject code which, when executed on a subject processor, would establish a subject process;
the translator process dynamically translating received subject code intended for execution on a subject processor into target code for execution by the target processor on the operating system;
populating a target process data structure accessible to the translator process with information concerning the translator process established in response to the received subject code; and
in response to a reference in the received subject code to information in a subject process filesystem, referring to the target process data structure populated with the information concerning the translator process instead of the target process file system of the operating system of the data processing system.

20. The method of claim 19, wherein the target process data structure resides in a shared memory region accessible to multiple translator processes including the translator process.

21. The method of claim 19, further comprising:
checking the status of processes whose information is stored in the target process data structure; and
removing from the target process data structure information relating to translator processes which are no-longer running.

22. The method of claim 21, wherein the step of checking the status of processes whose information is stored in the data structure is performed periodically.

23. The method of claim 19, further comprising:
recording that a reference has been made to information in the target process data structure by recording a first identifier for the translator process making the reference in association with a second identifier for the translator process whose information is being referenced.

24. The method of claim 23, further comprising:
removing from the target process data structure the first and second identifiers when the translator process whose information is being referenced is no-longer running.

25. The method of claim 19, further comprising removing information relating to a process which is no-longer running from the target process data structure.

26. The method of claim 19, and further comprising:
the data processing system establishing a further translator process in response to each received subject code instruction which, when executed on a subject processor, would establish a subject process.

27. The method of claim 26, wherein the translator process and each further translator process populate and refer to the same target process data structure.

28. The method of claim 19, wherein the populating comprises:
populating the target process data structure with a process identifier for each translator process, the process identifier corresponding to that which would be allocated to the subject processes established in response to the received subject code instructions, when executed on a subject processor.

29. The method of claim 19, wherein the translating comprises performing Solaris-to-Linux translation.

30. The method of claim 19, and further comprising:
the translator process, responsive a call in the subject code, verifying by reference to the target process data structure that a target process referenced by the call is currently running.

31. The method of claim 19, wherein the target process data structure includes information regarding a memory mapping of the translator process.

32. A program product, comprising:
a computer-readable storage medium; and
program code stored within the computer-readable storage medium and executable by a computer to perform:
establishing a translator process in response to received subject code which, when executed on a subject processor, would establish a subject process, wherein the translator process runs above an operating system of the computer, and wherein the operating system has a target process filesystem;
the translator process dynamically translating received subject code intended for execution on a subject processor into target code for execution by the target processor on an operating system;
populating a target process data structure accessible to the translator process with information concerning the translator process established in response to the received subject code; and
in response to a reference in the received subject code to information in a subject process filesystem, referring to the target process data structure populated with the information concerning the translator process instead of the target process filesystem of the operating system of the computer.

* * * * *